(12) United States Patent
Meisel

(10) Patent No.: US 7,197,640 B2
(45) Date of Patent: Mar. 27, 2007

(54) USE OF IDENTIFICATION CODES IN THE HANDLING AND MANAGEMENT OF COMMUNICATIONS

(76) Inventor: William S. Meisel, 18740 Paseo Nuevo Dr., Tarzana, CA (US) 91356

( * ) Notice: Subject to any disclaimer, the term of this patent is extended or adjusted under 35 U.S.C. 154(b) by 961 days.

(21) Appl. No.: 10/143,667

(22) Filed: May 9, 2002

(65) Prior Publication Data

US 2003/0033533 A1    Feb. 13, 2003

Related U.S. Application Data

(60) Provisional application No. 60/311,691, filed on Aug. 10, 2001.

(51) Int. Cl.
*H04L 9/00* (2006.01)

(52) U.S. Cl. .................... 713/168; 713/170; 726/27; 726/28

(58) Field of Classification Search ................ 726/1–4, 726/27–30; 713/168, 170; 707/3, 9
See application file for complete search history.

(56) References Cited

U.S. PATENT DOCUMENTS

| | | | |
|---|---|---|---|
| 5,095,480 A | 3/1992 | Fenner | |
| 5,343,529 A * | 8/1994 | Goldfine et al. | ............. 705/75 |
| 5,473,143 A | 12/1995 | Vak et al. | |
| 5,483,586 A | 1/1996 | Sussman | |
| 5,621,727 A | 4/1997 | Vaudreuil | |
| 5,659,596 A | 8/1997 | Dunn | |
| 5,740,231 A | 4/1998 | Cohn et al. | |
| 5,742,668 A | 4/1998 | Pepe et al. | |
| 5,742,905 A | 4/1998 | Pepe et al. | |
| 5,872,925 A | 2/1999 | Han | |
| 5,922,074 A | 7/1999 | Richard et al. | |
| 5,937,050 A | 8/1999 | Yue et al. | |
| 6,000,031 A | 12/1999 | Bingaman et al. | |
| 6,023,723 A | 2/2000 | McCormick et al. | |
| 6,052,709 A | 4/2000 | Paul | |
| 6,084,969 A | 7/2000 | Wright et al. | |
| 6,249,807 B1 | 6/2001 | Shaw et al. | |
| 6,317,745 B1 | 11/2001 | Thomas et al. | |
| 6,360,092 B1 | 3/2002 | Carrara | |

* cited by examiner

*Primary Examiner*—Hosuk Song
(74) *Attorney, Agent, or Firm*—Fish & Richardson P.C.

(57) ABSTRACT

When a message is to be transmitted to an intended recipient, a validation code may be incorporated into the message. The validation code, which may include, for example, a random string of alphanumeric characters or a time of day, also is transmitted to a central facility in a secure manner. A query that incorporates the validation code may be extracted from the message and sent to the central facility either by equipment associated with the intended recipient of the message or by a service provider that intercepts the message. The central facility can use the validation code to verify, with a relatively high degree of likelihood, whether the message was sent by the particular entity associated with the identification code. The central facility then can inform the intended recipient (or the service provider) whether the message was properly verified. To ensure that the central facility will be able to verify, with a relatively high degree of likelihood, that the message was sent by a valid holder of the identification code, the validation code may be encrypted before being sent to the central facility or it may be transmitted to the central facility, for example, over a virtual private network.

52 Claims, 6 Drawing Sheets

USE OF IDENTIFICATION CODES IN THE HANDLING AND MANAGEMENT OF COMMUNICATIONS

CROSS REFERENCE TO RELATED APPLICATIONS

This application claims the benefit of priority of U.S. Provisional Patent Application No. 60/311,691, filed Aug. 10, 2001 and incorporated herein by reference.

BACKGROUND

The disclosure relates generally to the use of identification codes in the handling and management of communications.

Various types of communication exist including telephone, electronic mail (email), facsimile (fax), paging, specialized wireless communications (such as Personal Digital Assistants), postal mail, and instant messaging. Managing the different types of communications has become increasingly complex for individuals as well as companies and organizations. For example, individuals may have multiple versions of a given type of communication, such as both business and home email addresses, as well as home, business, and wireless telephone numbers. Furthermore, the types of communications are becoming less distinct. Callers can retrieve email messages by telephone by having the messages read to them using text-to-speech synthesis, and can reply by voice. The reply voice messages may, in some implementations, be sent as an audio file attachment to an email message.

Applicant's pending U.S. patent application Ser. No. 09/618,145, filed Jul. 11, 2000, discloses techniques for handling and managing communications. As disclosed in that application, an individual can use a single identification code to send different types of communications. The intended recipient of a communication can control how the communication is handled based on the identification code of the sender to avoid unwanted contacts and to manage the receipt of different types of messages. The system can be used, for example, to detect and prevent the owner of an identification code from sending repeated mass transmissions or reaching a recipient without that recipient's explicit or implicit permission.

A problem, however, may arise if one person misappropriates another person's identification code and uses it to communicate with a third party, in effect impersonating the valid holder of the identification code.

SUMMARY

The disclosure relates generally to the use of identification codes in the handling and management of communications.

In general, when an electronic mail, telephone, instant messaging or other type of message is to be transmitted, an identification code associated with the entity sending the message may be added to the message. The sending party's identification code may be used to determine how the receiving end handles the message based, at least in part, on options set by the intended recipient for handling incoming communications.

In some embodiments, when a message is to be transmitted to an intended recipient, a validation code also is added to the message. The validation code, which may include, for example, a random string of alphanumeric characters or a time of day, also is transmitted to a central facility in a secure manner. A query that incorporates the validation code may be extracted from the message and sent to the central facility either by equipment associated with the intended recipient of the message or by a service provider that intercepts the message. The central facility can use the validation code to verify, with a relatively high degree of likelihood, whether the message was sent by the particular entity associated with the identification code and can inform the intended recipient (or the service provider) whether the message was properly verified. To ensure that the central facility will be able to verify, with a relatively high degree of likelihood, that the message was sent by a valid holder of the identification code, the validation code may be encrypted before being sent to the central facility or it may be transmitted to the central facility, for example, over a virtual private network.

Various features may be incorporated into the system either in a distributed or centralized manner depending, for example, on the type of communications involved. Thus, for telephone communications, it may be desirable to allow a service provider to add the validation code to the message. In contrast, for electronic mail or other types of communications, it may be desirable to use a distributed system in which equipment associated with the entity sending the message adds the validation code.

In many cases it may be desirable to incorporate the validation code into the messages expressly. However, it also is possible to use an implicit validation code, for example, where the time of day is used as the validation code. In such cases, the arrival times of the messages may be used as the validation code.

The systems and techniques described in greater detail below may improve the security of communications systems. In particular, they may help reduce the likelihood that a particular entity's identification code will be misused successfully by another entity.

Other features and advantages will be readily apparent from the following detailed description, the accompanying drawings and the claims.

DETAILED DESCRIPTION

Figure 1:
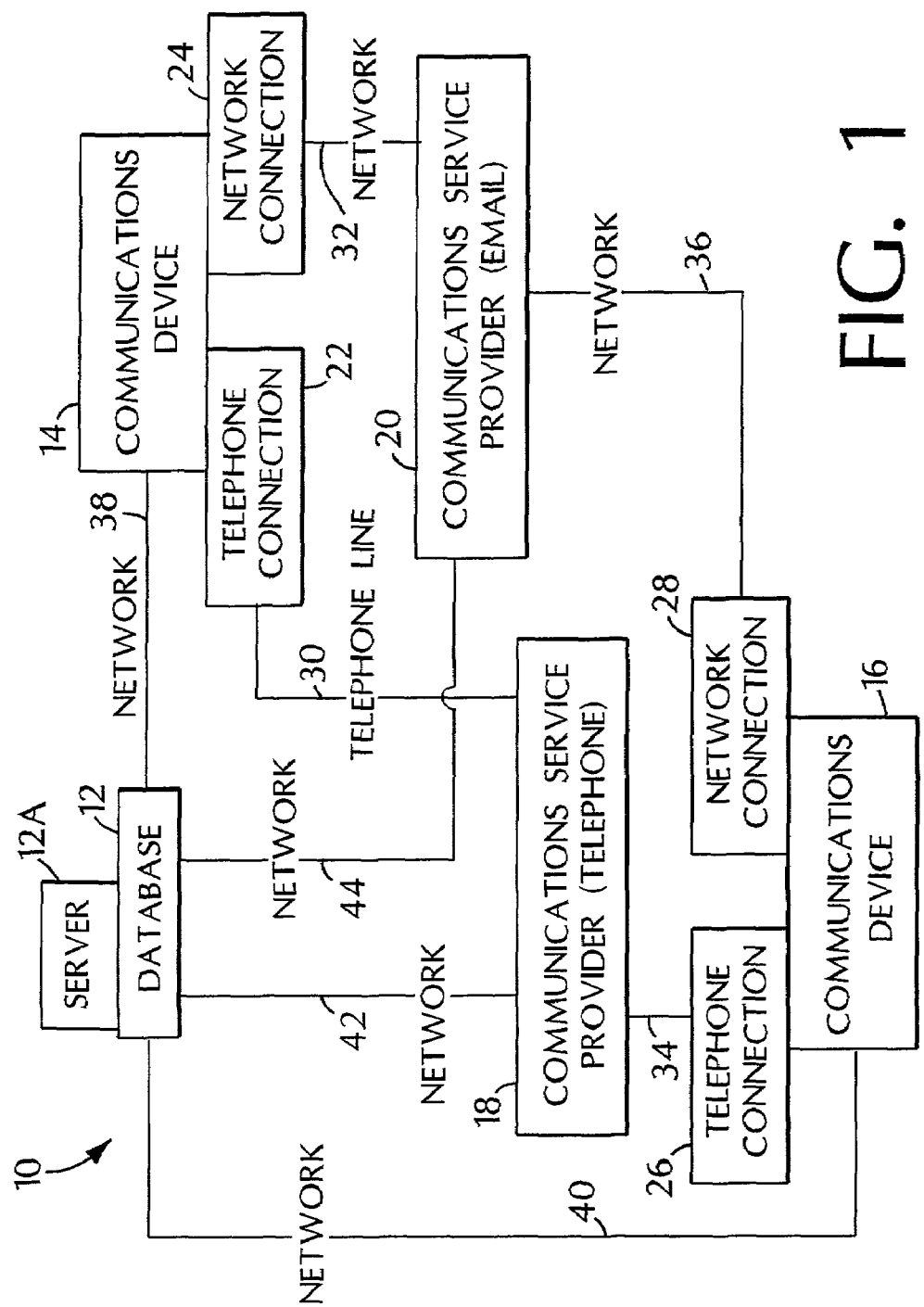
FIG. 1 illustrates an example of a communications system.

Referring to FIG. 1, communications through a system 10 may use any one of several types of communication. For example, the system 10 may include a telephone service provider facility 18 that allows a party to send communications from a communications device, such as a personal computer 14, through a telephone connection 22 over a telephone line 30 or a wireless connection. The system also can include an email service provider facility 20 that allows a party to send communications from the personal computer 14 through a network connection 24 over a network 20 such as the Internet. The personal computer 14 also can receive incoming communications over the telephone line 30 and network 32.

As shown in FIG. 1, the service provider facilities 18, 20 are connected, respectively, through a telephone line 34 and network 36 to another communications device such as personal computer 16. Telephone and network connections 26, 28 also are provided for the personal computer 16. Although only two communications devices 14, 16 are illustrated in FIG. 1, the system 10 may include many more communications devices, as well as service provider facilities and associated networks and connections.

Other service providers, such as facsimile service, pagers and instant messaging, also may be incorporated in the system 10. Similarly, other communications devices, including standard and enhanced telephones, as well as personal digital assistants (PDAs) and pagers, can be used with appropriate connections to service providers instead of or in addition to the personal computers 14, 16.

The system 10 also includes a central database 12 and associated server 12A. Each of the personal computers 14, 16 and the service providers 18, 20 may be connected, respectively, to the database 12 and server 12A over networks 38, 40, 42, 44. Depending on the types of communications involved, some of the connections may use wireless technologies.

Figure 2:
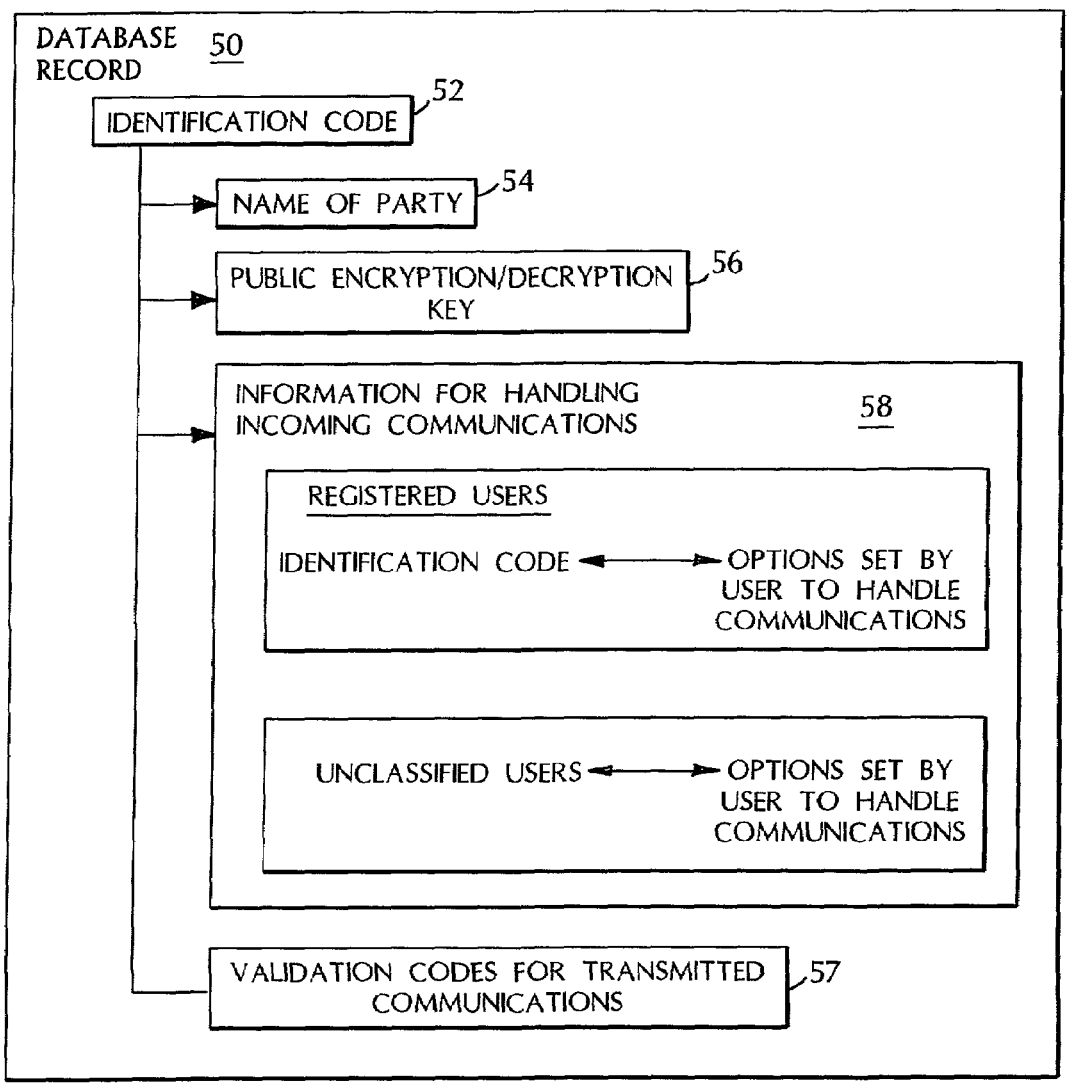
FIG. 2 illustrates an example of the structure of a record stored in a central database in the communications system.

Referring to FIG. 2, the database 12 stores a record 50, including a unique communications identification code 52, for each party that is enrolled in the system 10. The identity 54 of the party associated with each particular code also is stored in the database 12. The identification code 52 may be independent of any particular type of communication medium and, therefore, may be used for communications over different media. A party may use a single identification code, for example, in connection with email, telephone, instant messaging, paging and other types of communications.

Each identification code may take the form of an alphanumeric string. In some implementations, the codes may consist only of numbers so that they easily can be entered on keypads or spoken and recognized accurately with automatic speech recognition equipment. The strings of numbers preferably have internal relationships such as check-sums, that allow the codes to be validated, thereby facilitating detection of fraudulent numbers. The codes should be long enough so that they can provide unique identifiers for a large number of people. Also, the number of valid codes can be limited to a small fraction of the possible codes to reduce the likelihood that guessing a number randomly will generate a valid code. In some implementations, a party also can choose an alphanumeric alias that is not in use and that can be used as a shortened version of the identification code when a full keyboard is available. Optionally, when entered on a telephone or similar keypad, alphanumeric codes can be translated into corresponding numeric codes. To avoid conflicts when entering identification codes this way, alphanumeric codes may be generated so that they are unique even when entered on a telephone or similar keypad using the letters on the keypad for the letters in the code.

Additional information stored in the database 12 may include the party's public encryption key 56. Validation code 57 corresponding to messages sent to the party also may be stored in the database 12 along with the identification codes of the parties that sent the messages. Details of the verification process are discussed below.

In general, a party may access the database 12 to set various options to allow incoming communications to be managed automatically according to the options selected by the recipient. For example, a party may select options to block all communications for which the sender does not provide its identification code or the party may choose to block all communications from a particular source. Alternatively, communications from various sources can be categorized by priority so that communications having different priorities are handled differently. For example, high priority telephone calls may be forwarded to a wireless phone, whereas lower priority calls may be forwarded to a message center. Similarly, business emails may be forwarded to a business email address, whereas personal emails may be forwarded to a personal email address. In addition, the type of access allowed by a particular source can be controlled. For example, a party might choose to receive communications from a particular source only by email. Other options can be selected by the party and stored in the database 12. Information 58 corresponding to the options set by the user for handling incoming communications may be stored in the database.

Figure 3A:
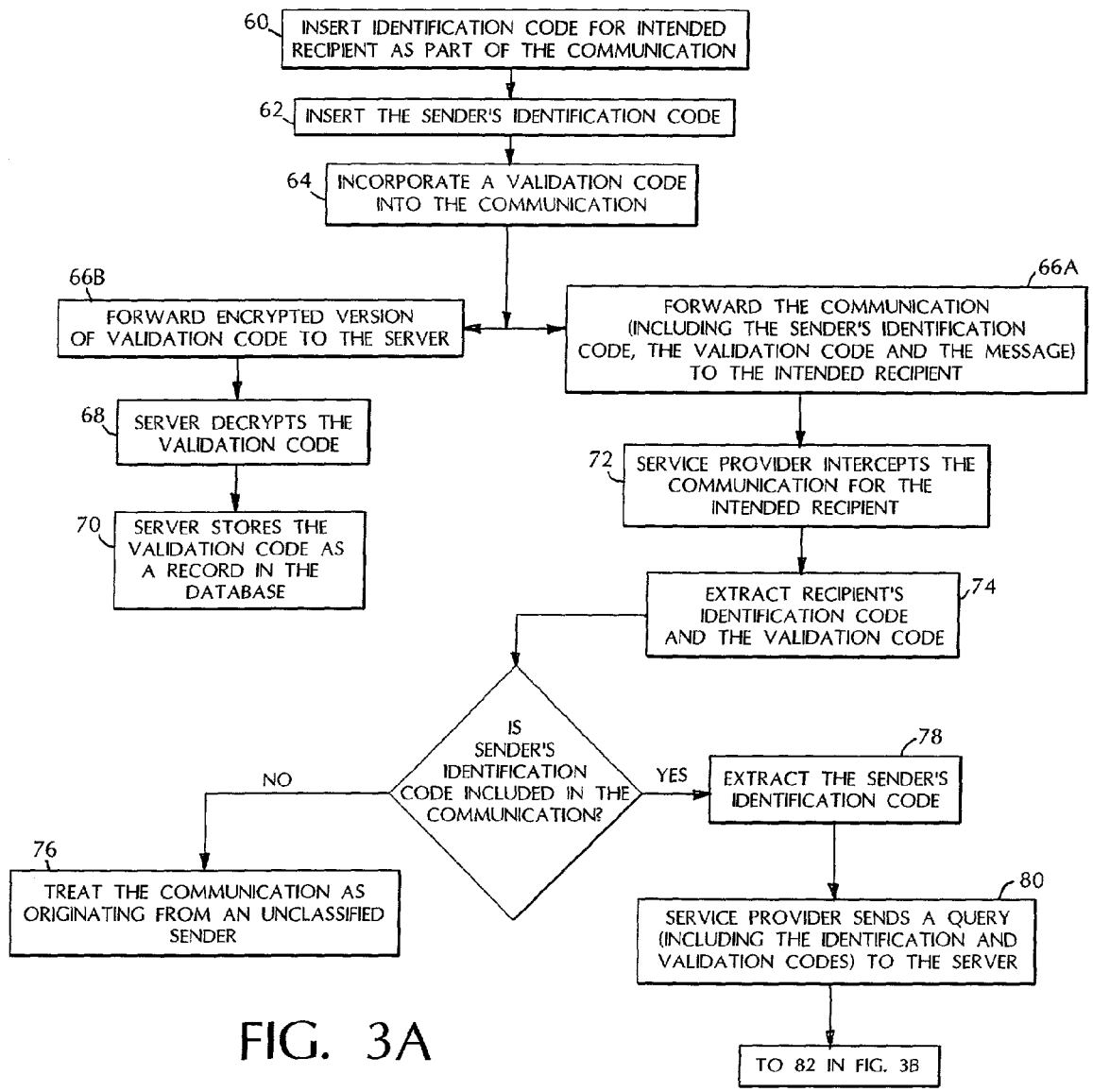
FIG. 3 is a flow chart of a method for handling a communication.
Figure 3B:
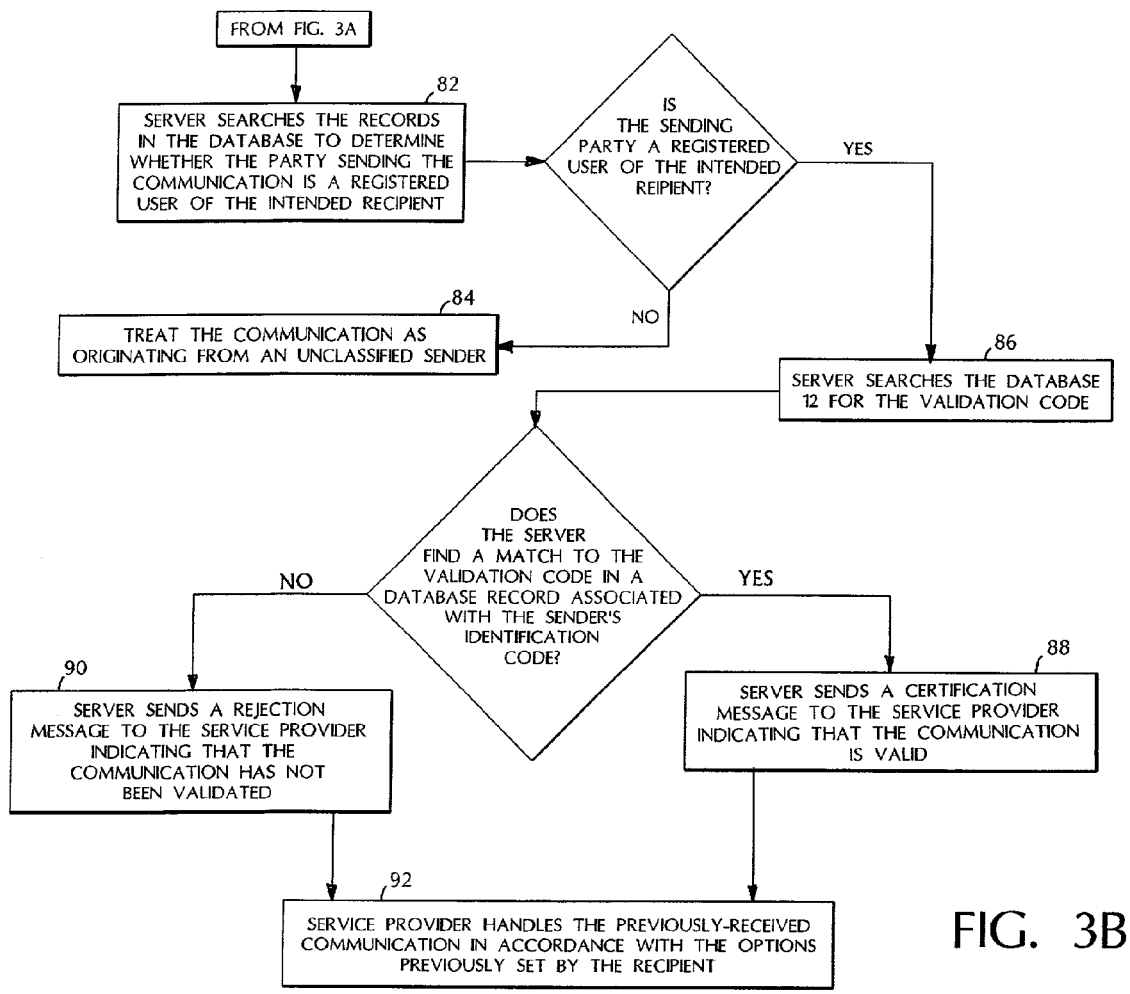

Referring to FIGS. 3A and 3B, when a party wishes to transmit a communication through the system 10, the sender inserts 60 the identification code for the intended recipient as part of the communication. In addition to the recipient's identification code, communications transmitted through the system 10 should include 62 the sender's identification code.

In various implementations, the identification codes may be incorporated into the communication either manually or automatically. Manually entering the identification codes may include the following. For telephone communications, the identification codes may be entered using a telephone keypad. Alternatively, the identification codes may be spoken into the telephone receiver and recognized using speech recognition techniques. For email communications, the recipient's code may be included in the "to" field and the sender's code may be included in the "from" field. Alternatively, the identification codes may be included in the body of the email message and indicated by a marker or simply recognized by context. The recipient and sender's identification codes also may be used in other forms of communication, including instant messaging.

A specific device, such as a personal computer or wireless telephone, may be associated with a particular sender so that the sender's identification code automatically is incorporated as part of the communication prior to transmittal. Software may be associated with the personal computers 14, 16 or other devices to permit the sender's identification code to be incorporated into the message automatically.

In yet other implementations, the sender or recipient's identification code may be entered automatically in response to the entry of corresponding information. In one example, a person sending a voice communication by telephone would speak the name of the recipient into the telephone receiver to initiate the communication. The recipient's identification code would automatically be retrieved from a directory and placed into the communication.

Software associated with the sending party's personal computer or other transmitting device automatically incorporates 64 a validation code into the communication as well. The validation code may include, for example, a randomly-generated string of alphanumeric characters. If a random number is used, it should have a sufficiently large number of characters to make it unlikely that the code will be replicated within a short period of time. Alternatively, the validation code may include the date and time of day the message is transmitted. If the validation code includes the time of day, the code may be set, for example, to the nearest minute.

The communication (including the recipient's identification code, the sender's identification code and the validation code) is automatically forwarded 66 to the intended recipient. In addition, an encrypted version of the validation code is forwarded, along with the sending party's identification code, to the server 12A. Software or circuitry associated with the sending party's personal computer 14 may encrypt the validation code automatically.

Figure 4A:
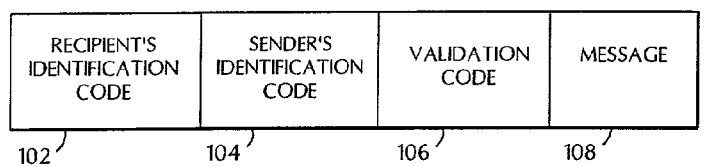
FIGS. 4A, 4B, 4C and 4D illustrate examples of the formats of communications including identification and validation codes.
Figure 4B:
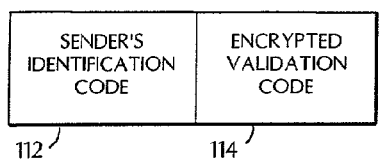

As an example, referring to FIG. 1, it is assumed that the sending party wishes to send an email message from the personal computer 14 to a recipient at the personal computer 16. The email communication 100 (including the recipient's identification code 102, the sender's identification code 104, the validation code 106 and a message 108) would be sent 66A from the personal computer 14 to the personal computer 16 over the networks 32, 36 and the service provider 20 (see FIG. 4A). At about the same time, a second communication 110 (including the sender's identification code 112 and the validation code 114) is sent 66B from the personal computer 14 to the server 12A over the network 38 (see FIG. 4B). To ensure that the central facility will be able to verify, with a relatively high degree of likelihood, that the message was sent by a valid holder of the identification code, the validation code may be encrypted before being sent to the central facility. The validation code may be encrypted, for example, using the sending party's private encryption key using Public Key Technology (PEK) or other encryption techniques. Alternatively, a secure path may be provided through a virtual private network between the device 14 and the server 12A. Software associated with the personal computer 14 may encrypt the validation code and transmit the second communication to the server 12A automatically so that the sending party need not enter any additional information or perform any additional tasks beyond those otherwise required to send an email message to the intended recipient.

In response to receiving the encrypted validation code, the server 12A decrypts 68 the validation code 114 and stores 70 the validation code as a record associated with the sending party's identification code (see FIG. 2). To decrypt the validation code 114, the server may retrieve the sending party's public encryption key from the database record associated with the sending party.

In one implementation, the service provider 20 intercepts 72 the first communication that is addressed to the recipient, which in this example is an entity associated with the personal computer 16. The recipient's identification code 102 is extracted 74 from the intercepted communication. If the sender's identification code is not included in the communication, then the communication is treated 76 as originating from an unclassified sender. Assuming that the sender's identification code 104 is included in the communication, it too is extracted 78. Control software generates a query that may include the sender and recipient's identification codes. The query is sent 80 to the server 12A to check whether the sender is a registered user of the intended recipient. The control software also extracts and sends the validation code 106 to the server 12A as part of the query.

The server 12A searches 82 the records in the database 12 to determine whether the party sending the communication is a registered user of the intended recipient and to confirm that the person indicated by the sending party's identification code actually sent the message. The server may determine whether the sender is a registered user of the intended recipient by checking the information 58 stored in the database record for the intended recipient.

If the sender is not a registered user of the recipient, then the communication is treated 84 as originating from an unclassified sender. Communications from unclassified senders may be treated according to the options previously selected by the intended recipient or according to default options stored in the database 12.

If the sender is listed as a registered user of the recipient, the server 12A searches 86 the database 12 for the validation code received from the personal computer 16. If the server 12A finds a match to the validation code in a database record associated with the sender's identification code, then the server sends 88 a certification message to the service provider 20. The certification message indicates that the previously-received communication is valid and was sent by the person associated with the sending party's identification code. On the other hand, if the server 12A does not locate a match to the validation code, then the server sends 90 a rejection message to indicate that the previously-received communication has not been validated. The server also retrieves information from the database 12 indicating the options selected by the intended recipient for handling the particular type of communication. The relevant information is transmitted to the service provider facility 20.

In response to receiving either the certification or rejection message from the server 12A, the service provider 20 handles 92 the previously-received communication in accordance with the options previously set by the recipient and stored in the database 12 for communications originating from the particular sender.

Handling of a particular communication may include one or more of the following actions depending on the options previously set by the recipient and stored in the database 12. The control instructions as dictated by the options selected by the intended recipient and stored in the database 12 may indicate that communications from unclassified senders should be treated, for example, as low-priority messages or simply rejected.

Some communications may be rejected if the intended recipient sets options to block all communications from the sender or communications sent by the sender over a particular communications medium. In such situations, the content of the communication can be saved in the database 12 for a specified period in case the recipient wishes to recover or review rejected messages.

In some situations, the recipient's instructions—as indicated by the selected options stored in the database 12—may require changing the form of a message. For example, a recipient may want voice messages from a particular party to be delivered as attachments to an email message. In other cases, the recipient may want email messages to be communicated over the telephone using text-to-speech synthesis. Technology for performing such text-to-speech synthesis is available commercially.

In some cases, existing features of the message type are used. Thus, some email systems are capable of attaching an indication of priority to the communication, and some email programs handle different priorities differently, for example, by storing them in different electronic folders and/or highlighting high priority messages. Existing telephone systems can put a call through or put it into a voice mail queue. Some systems allow high-priority queues. The options selected by the recipient and stored in the database 12 may indicate, for example, that for high-priority messages or messages from specific individuals, the recipient should be paged or called on a mobile phone. If there are multiple addresses for the message type, for example, if there are multiple phone numbers, the options set by the recipient may indicate where messages from the sender should be directed. The foregoing features, as well as other features, may be included among the various options from which the recipient can select how incoming communications should be handled.

In other situations, control instructions stored in the database 12 may indicate whether the sender is to be informed of the disposition of the message. For example, the options set by the intended recipient may indicate that a reply should be sent to a party whose message was rejected indicating that the message was undeliverable. For high-priority messages, the options set by the recipient may dictate that the sender should receive a courtesy reply that the message was received and that a substantive reply can be expected soon.

The recipient may be informed as to the status of each communication it receives, in particular, whether the communication's validation code was checked and whether the communication was, in fact, certified as valid. The status of the communication may be indicated to the user by an indicator that is incorporated into the communication and that is visible or audible to the recipient, depending on the type of communication. For email communications, the indicator may include a visible symbol or phrase appearing in an existing or new field in the message. Similarly, for telephone communications, the indicator may include an audible signal.

In the implementations discussed above, each service provider 18, 24 may store and execute software instructions to query the database 12 and to handle the management of communications based on information stored in the database 12. In such a distributed scenario, the service providers 18, 24 can utilize the database 12 as an information resource or can form part of a forwarding service of the database itself. In other implementations, the software for handling and manage communications may reside locally at the receiving end of the communication, for example, in the recipient's personal computer 16 for email or telephony.

Figure 5:
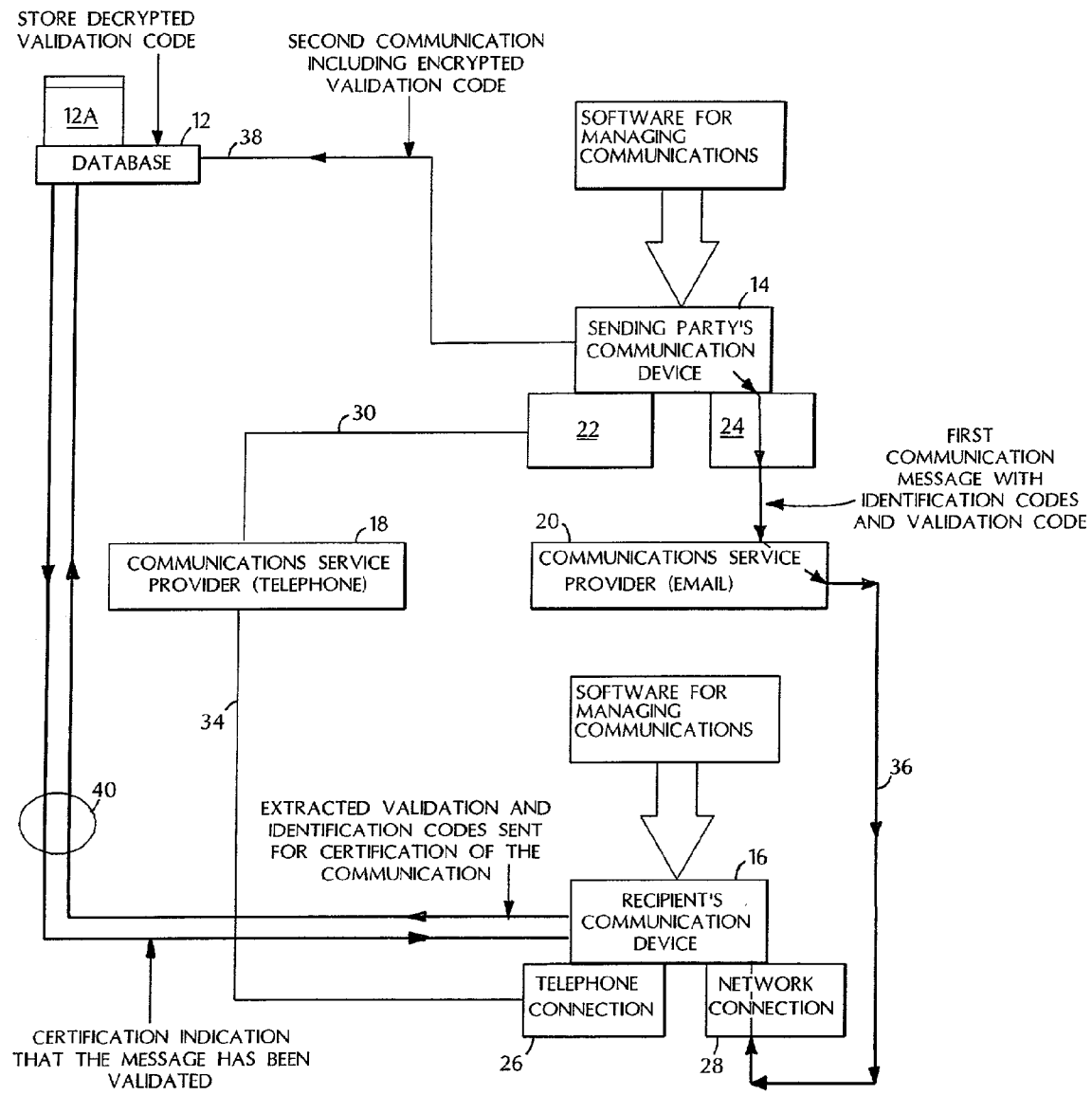
FIG. 5 illustrates how a communication is transmitted and validated according to one implementation.

FIG. 5 illustrates a scenario in which software for handling management of transmitted communications resides locally at the receiving communications device 16. FIG. 5 indicates the paths over which information flows from transmittal of the original communication through certification of the communication as valid. The information needed by the software at the recipient's device 16 to complete managing the call according to the options previously selected by the recipient may be sent together with the certification message. Alternatively, that information may be provided in response to subsequent queries to the server 12A.

In the implementations discussed above, software associated with the sending party's device 14 generates the encrypted version of the validation code 114 that is sent to the database 12. In some implementations, such as instant messaging or telephone communications, it may be desirable to provide such software at the service providers 20, 22 instead of locally at each device 14. Software associated with the service provider's facility may be used to identify the sending party, for example, using the sending party's telephone number, email address or instant messaging handle, depending on the type of communication. Based on that information, the service provider automatically would insert the sending party's identification code, as well as a validation code, into the communication. The service provider would forward the initial communication, together with the inserted codes, to the intended recipient and would generate and send the second communication (including the identification code and encrypted validation code) to the server 12A. The recipient's device 16 then may query the database 12 to certify the received message as valid and to request information regarding the options previously selected by the recipient for handling the incoming communication.

In those situations where the service provider is programmed to insert the sending party's identification based on the sending party's telephone number, etc., additional security may be desirable. For example, multiple persons may have access to the telephone, thus making it more difficult to ensure that the owner of the telephone is the person initiating the communication. The sending party may, therefore, choose or be required to provide additional identification. The additional identification may be provided, for example, through the use of voice recognition or biometric information.

Each communications device such as the device 16 also may include software and/or hardware to allow a user to turn the validation option on or off. Additionally, a user may change the way in which the system is set to handle communications addressed to the user. Such changes can be made by accessing the database 12, for example, from a communications device 14, 16 and changing the settings for the options for handling incoming communications from either registered or unclassified users.

Figure 4C:
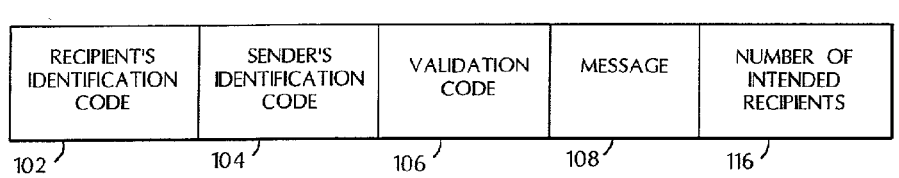
Figure 4D:
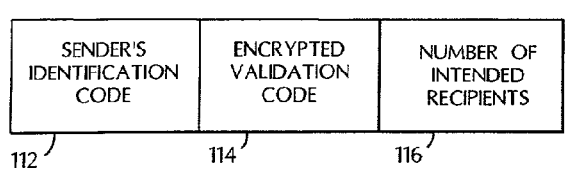

If an email message or other communication is intended for multiple recipients, a separate validation code may be generated for each recipient. Alternatively, a single validation code may be used regardless of the number of intended recipients. In addition to the validation code, the control software associated with the sending party's personal computer 14 may incorporate an indicator 116 identifying the number of intended recipients into both the first and second communications 100, 110 (see FIGS. 4C and 4D). Using such a technique may be particularly useful where the date and/or time is used as the validation code.

Where a single validation code 106 is used along with an indication of the number of recipients 116, the server 12A is programmed to allow no more than the specified number of messages to be validated with respect to the combination of the particular validation code and the sending party's identification code. For example, if person A transmits a communication intended for three recipients with a particular validation code, then the server 12A would allow only three messages that incorporate person A's identification code and the particular validation code to be certified as valid. If a fourth such message were subsequently received, it would not be certified as valid. In such a situation, the server may send an alert to each recipient that the communication it received may have been certified improperly as valid. Each recipient then could check directly with the sending party to confirm whether that party sent the communication.

In situations where the time of day is used as the validation code, the validation code may be implicitly included in the communication rather than explicitly identified. Assuming, for example, that the message sent to the database 12 from the sending party's computer 14 arrives at the database within the same minute as the codes extracted from the message forwarded to the intended recipient, the server 12A may simply compare those arrival times. If the arrival times match, or if they are within a predetermined period (such as one minute) of one another, then the message is assumed to be valid.

Where the time of day is used as the validation code, messages sent at substantially the same time—but using different type of communications (such as email, telephone and instant messaging)—also may include a code indicative of the type of communication to reduce overlapping validation codes.

In some implementations, it may be desirable to limit the number of validation codes that may be issued in connection with messages that are sent using a particular sending party's identification code. Alternatively, an upper limit may be placed on the number of messages that may be sent within a specified time period using the party's identification code. In other implementations, the sending party may be charged a fixed fee each time a validation code is issued in connection with a message that uses that party's identification code.

The database 12 should be secure from unauthorized intrusion. An associated archive may be provided to store backup data and changes to the database contents. One or more mirror encrypted databases may be included to provide additional reliability.

The techniques described above may be implemented in hardware, software or a combination of both. In one implementation, circuitry may include, for example, dedicated processors with software instructions for performing the functions described above. Alternatively, the circuitry may include general-purpose processors programmed to perform the functions described above. Computer-executable instructions for implementing the techniques may be stored as encoded information on a computer-readable medium such as a magnetic floppy disk, magnetic tape, or compact disc read only memory (CD-ROM).

The patent applications identified above are incorporated herein by reference.

Other implementations are within the scope of the claims.

What is claimed is:

1. A method comprising:
   receiving a query based on a first communication addressed to an intended recipient, the query including a validation code and a first identification code both of which are extracted from the first communication, the first identification code being associated with a particular entity;
   receiving from the particular entity a second communication that includes the validation code and the first identification code;
   verifying whether the first communication was sent by the same entity that sent the second communication; and
   providing an indication, in reply to the query, of whether the first communication was sent by the particular entity associated with the first identification code.

2. The method of claim 1 including:
   storing the validation code from the second communication in a database record associated with the particular entity; and
   comparing the validation code in the query to the stored validation code.

3. The method of claim 2 wherein the validation code in the second communication is encrypted, the method including decrypting the validation code in the second communication prior to said comparing.

4. The method of claim 1 wherein the query includes a second identification code associated with the intended recipient of the first communication, the method including sending information indicative of how to handle the first communication, the information being at least partially based on options set by the intended recipient for handling incoming communications.

5. The method of claim 1 wherein the second communication includes an indication of the number of intended recipients for the first communication, the method including using said validation code to verify whether the first communication was sent by the same entity that sent the second communication up to a maximum number of times, the maximum number of times corresponding to the number of intended recipients.

6. An apparatus comprising:
   circuitry to receive a query based on a first communication addressed to an intended recipient, the query including a validation code and a first identification code both of which are extracted from the first communication, the first identification code being associated with a particular entity;
   circuitry to receive a second communication from the particular entity, wherein the second communication includes the validation code and the first identification code;
   circuitry to verify whether the first communication was sent by the same entity that sent the second communication; and
   circuitry to provide an indication, in reply to the query, of whether the first communication was sent by the particular entity associated with the first identification code.

7. The apparatus of claim 6 including:
   memory to store the validation code from the second communication as a record associated with the particular entity; and
   circuitry to compare the validation code in the query to the stored validation code.

8. The apparatus of claim 7 wherein the validation code in the second communication is encrypted, the apparatus including circuitry to decrypt the validation code in the second communication.

9. The apparatus of claim 6 wherein the query includes a second identification code associated with the intended recipient of the first communication, the apparatus including circuitry to send information indicative of how to handle the first communication, the information being at least partially based on options set by the intended recipient for handling incoming communications.

10. The apparatus of claim 6 wherein the second communication includes an indication of the number of intended recipients for the first communication, the apparatus including circuitry to use said validation code to verify whether the first communication was sent by the same entity that sent the second communication up to a maximum number of times, the maximum number of times corresponding to the number of intended recipients.

11. The apparatus of claim 6 including circuitry to limit a number of validation codes that may be verified in connection with messages associated with a particular identification code.

12. An article comprising a machine-readable medium storing instructions that, when applied to a machine, cause the machine to:
   verify whether a first communication addressed to an intended recipient and a second communication that includes a validation code and a first identification code were sent by the same entity, wherein said verifying is in response to receiving a query based on the first communication, the query including the validation code and the first identification code both of which are extracted from the first communication, the first identification code being associated with a particular entity; and
   provide an indication, in response to the query, of whether the first communication was sent by the particular entity associated with the first identification code.

13. The article of claim 12 including machine-readable instructions to cause the machine to:
- store the validation code from the second communication in a record associated with the particular entity; and
- compare the validation code in the query to the stored validation code.

14. The article of claim 13 wherein the validation code in the second communication is encrypted, the article including machine-readable instructions to cause the machine to decrypt the validation code in the second communication prior to comparing the validation code in the query to the stored validation code.

15. The article of claim 12 wherein the query includes a second identification code associated with the intended recipient of the first communication, the article including machine-readable instructions to cause the machine to send information indicative of how to handle the first communication, the information being at least partially based on options set by the intended recipient for handling incoming communications.

16. The article of claim 12 wherein the second communication includes an indication of the number of intended recipients for the first communication, the article including machine-readable instructions to cause the machine to use said validation code to verify whether the first communication was sent by the same entity that sent the second communication up to a maximum number of times, the maximum number of times corresponding to the number of intended recipients.

17. A method comprising:
- receiving a request from a particular entity to send a communication to an intended recipient;
- adding an identification code and a separate validation code to the communication, the identification code being associated with the particular entity and the validation code being associated with the communication; and
- transmitting the communication, including the identification code and the separate validation code, to the intended recipient and transmitting the validation code to a central facility that stores information indicative of how communications directed to the intended recipient are to be handled and that uses the validation code to verify whether the validation code was sent by the same entity that sent the communication.

18. The method of claim 17 including encrypting the validation code and sending the encrypted validation code to the central facility.

19. The method of claim 17 including transmitting the validation code to the central facility over a virtual private network.

20. The method of claim 17 wherein adding an identification code and a validation code to the communication occurs locally in equipment associated with the particular entity.

21. The method of claim 17 wherein adding an identification code and a validation code to the communication occurs at a service provider's facility.

22. The method of claim 17 wherein adding a validation code includes generating a random string of alphanumeric characters.

23. The method of claim 17 wherein adding a validation code includes inserting a time of day into the communication.

24. An apparatus comprising:
- circuitry to receive a request from a particular entity to send a communication to an intended recipient;
- circuitry to add an identification code and a separate validation code to the communication, the identification code being associated with the particular entity and the validation code being associated with the communication; and
- circuitry to transmit the communication, including the identification code and the separate validation code, to the intended recipient and to transmit the validation code to a central facility that stores information indicative of how communications directed to the intended recipient are to be handled and that uses the validation code to verify whether the validation code was sent by the same entity that sent the communication.

25. The apparatus of claim 24 including circuitry to encrypt the validation code and send the encrypted validation code to the central facility.

26. The apparatus of claim 25 including circuitry to automatically add the identification code and the encrypted validation code to the communication.

27. An article comprising a machine-readable medium storing instructions that, when applied to a machine, cause the machine to:
- add an identification code and a separate validation code to a communication in response to receiving a request from a particular entity to send the communication to an intended recipient, the identification code being associated with the particular entity and the validation code being associated with the communication;
- transmit the communication, including the identification code and the separate validation code, to the intended recipient; and
- transmit the validation code to a central facility that stores information indicative of how communications directed to the intended recipient are to be handled and that uses the validation code to verify whether the validation code was sent by the same entity that sent the communication.

28. The article of claim 27 including machine-readable instructions to cause the machine to encrypt the validation code and send the encrypted validation code to the central facility.

29. A method comprising:
- receiving a communication addressed to an intended recipient, the communication including a validation code and a separate first identification code, the first identification code being associated with a particular entity;
- requesting a central facility to verify, based on the validation code, whether the communication was sent by the particular entity associated with the first identification code;
- receiving a reply from the central facility regarding whether the communication was sent by the particular entity associated with the first identification code; and
- handling the communication according to information from the central facility, the information being at least partially based on options previously set by the intended recipient for handling incoming communications.

30. The method of claim 29 including providing an indication to the intended recipient of whether the communication was validated as having been sent by the particular entity associated with the first identification code.

31. The method of claim 29 including receiving an acknowledgement that the communication was verified as having been sent by the particular entity associated with the first identification code.

32. An apparatus comprising:
circuitry to receive a communication addressed to an intended recipient, the communication including a validation code and a separate first identification code, the first identification code being associated with a particular entity;
circuitry to request a central facility to verify, based on the validation code, whether the communication was sent by the particular entity associated with the first identification code;
circuitry to receive a reply from the central facility regarding whether the communication was sent by the particular entity associated with the first identification code; and
circuitry to handle the communication according to information from the central facility, the information being at least partially based on options previously set by the intended recipient for handling incoming communications.

33. The apparatus of claim 32 including circuitry to provide an indication to the intended recipient of whether the communication was validated as having been sent by the particular entity associated with the first identification code.

34. An article comprising a machine-readable medium storing instructions that, when applied to a machine, cause the machine to:
request a central facility to verify based on a validation code whether a communication addressed to an intended recipient was sent by a particular entity associated with a first identification code, the request being made in response to receiving the communication addressed to the intended recipient, the communication including the validation code and a separate first identification code; and
handle the communication according to information from the central facility, the information including an indication of whether the communication was sent by the particular entity associated with the first identification code and the information being at least partially based on options previously set by the intended recipient for handling incoming communications.

35. The article of claim 34 including machine-readable instructions to cause the machine to provide an indication to the intended recipient of whether the communication was validated as having been sent by the particular entity associated with the first identification code.

36. A system comprising:
a communications device;
a service provider facility coupled to the first communications device; and
a central database facility coupled to the service provider and the communications device,
the first communications device configured to:
add a first identification code and a validation code to a message; and
transmit a communication addressed to an intended recipient, the communication including the message, the first identification code and the validation code; and
transmit the first identification code and the validation code to the central database facility,
the service provider facility configured to:
intercept the communication;
extract the first identification code and the validation code from the communication; and
send a query to the central database facility requesting confirmation of whether the communication was sent by a particular entity associated with a first identification code, the query including the identification code and validation code extracted from the communication;
the central database facility configured to:
determine whether, based on the validation code, the communication was sent by the particular entity associated with the first identification code; and
send to the service provider facility information indicative of how the communication is to be handled based, at least in part, on options set by the intended recipient for handling incoming communications; and
the service provider facility further configured to handle the communication from the communications device according to the information received from the central database facility.

37. The system of claim 36 wherein the communications device is configured to send the validation code to the central database facility over a secure route.

38. The system of claim 36 wherein the communications device is configured to encrypt the validation code and send the encrypted validation code to the central database facility, and the central database facility is configured to:
decrypt the validation code received from the communications device; and
compare the validation code in the query to the decrypted validation code.

39. The system of claim 38 wherein the communications device is configured to encrypt the validation code using a private encryption key of the particular entity associated with a first identification code, and the central database facility is configured to decrypt the validation code using a public key of the particular entity associated with a first identification code.

40. The system of claim 36 wherein the communications device is configured to transmit to the central database facility an indication of the number of intended recipients of the communication, and the central database facility is configured to use said validation code to verify whether communications were sent by the particular entity associated with the first identification code up to a maximum number of times, the maximum number of times corresponding to the number of intended recipients.

41. The system of claim 36 wherein the communications device includes a personal computer.

42. A system comprising:
first and second communications devices;
a service provider facility coupled to the first and second communications devices; and
a central database facility coupled to the service provider and the first and communications devices,
the first communications device for transmitting a message to an intended recipient associated with the second communications devices;
the service provider facility configured to:
intercept the message;
add a first identification code and a validation code to the message, the first identification code associated with a particular entity that sent the message;
transmit a communication to the second communications device, the communication including the message, the first identification code and the validation code; and
transmit the first identification code and the validation code to the central database facility,
the second communications device configured to:

extract the first identification code and the validation code from the communication; and send a query to the central database facility requesting confirmation of whether the communication was sent by the particular entity associated with the first identification code, the query including the identification code and validation code extracted from the communication;

the central database facility configured to:

determine whether, based on the validation code, the message was generated by the particular entity associated with the first identification code; and send to the second communications device information indicative of how the message is to be handled based, at least in part, on options set by the intended recipient for handling incoming communications; and the second communications device further configured to handle the message according to the information received from the central database facility.

43. The system of claim 42 wherein the service provider facility is configured to encrypt the validation code and send the encrypted validation code to the central database facility, and the central database facility is configured to:

decrypt the validation code received from the service provider facility; and compare the validation code in the query to the decrypted validation code.

44. The system of claim 43 wherein the service provider facility is configured to encrypt the validation code using a private encryption key of the particular entity associated with a first identification code, and the central database facility is configured to decrypt the validation code using a public key of the particular entity associated with a first identification code.

45. The system of claim 43 wherein the first communications device includes a telephone.

46. A system comprising:

first and second communications devices;

a service provider facility coupled to the first and second communications devices; and a central database facility first and second communications devices;

the first communications device configured to:

add a first identification code and a validation code to a message; and transmit a communication addressed to an intended recipient through the service provider facility, the communication including the message, the first identification code and the validation code; and transmit the first identification code and the validation code to the central database facility, the second communications device configured to:

receive the communication;

extract the first identification code and the validation code from the communication; and send a query to the central database facility requesting confirmation of whether the communication was sent by a particular entity associated with the first identification code, the query including the identification code and validation code extracted from the communication;

the central database facility configured to:

determine whether, based on the validation code, the communication was sent by the particular entity associated with the first identification code; and send to the second communications device information indicative of how the communication is to be handled based, at least in part, on options set by the intended recipient for handling incoming communications; and the second communications device further configured to handle the communication according to the information received from the central database facility.

47. The system of claim 46 wherein the first communications device is configured to send the validation code to the central database facility over a secure route.

48. The system of claim 46 wherein the first communications device is configured to encrypt the validation code and send the encrypted validation code to the central database facility, and the central database facility is configured to:

decrypt the validation code received from the first communications device; and compare the validation code in the query to the decrypted validation code.

49. The system of claim 48 wherein the first communications device is configured to encrypt the validation code using a private encryption key of the particular entity associated with a first identification code, and the central database facility is configured to decrypt the validation code using a public key of the particular entity associated with a first identification code.

50. The system of claim 46 wherein the first communications device is configured to transmit to the central database facility an indication of the number of intended recipients of the communication, and the central database facility is configured to use said validation code to verify whether communications were sent by the particular entity associated with the first identification code up to a maximum number of times, the maximum number of times corresponding to the number of intended recipients.

51. A method comprising:

receiving a query based on a first communication addressed to an intended recipient, the query including a first identification code extracted from the first communication and associated with a particular entity;

receiving a second communication that includes the first identification code;

comparing a time of arrival of the query with a time of arrival of the second communication;

verifying whether, based on said comparing, the first communication was sent by the same entity that sent the second communication; and providing an indication, in reply to the query, of whether the first communication was sent by the particular entity associated with the first identification code.

52. The method of claim 51 wherein the query includes a second identification code associated with the intended recipient of the first communication, the method including sending information indicative of how to handle the first communication, the information being at least partially based on options set by the intended recipient for handling incoming communications.

* * * * *